United States Patent Office 3,383,788
Patented May 21, 1968

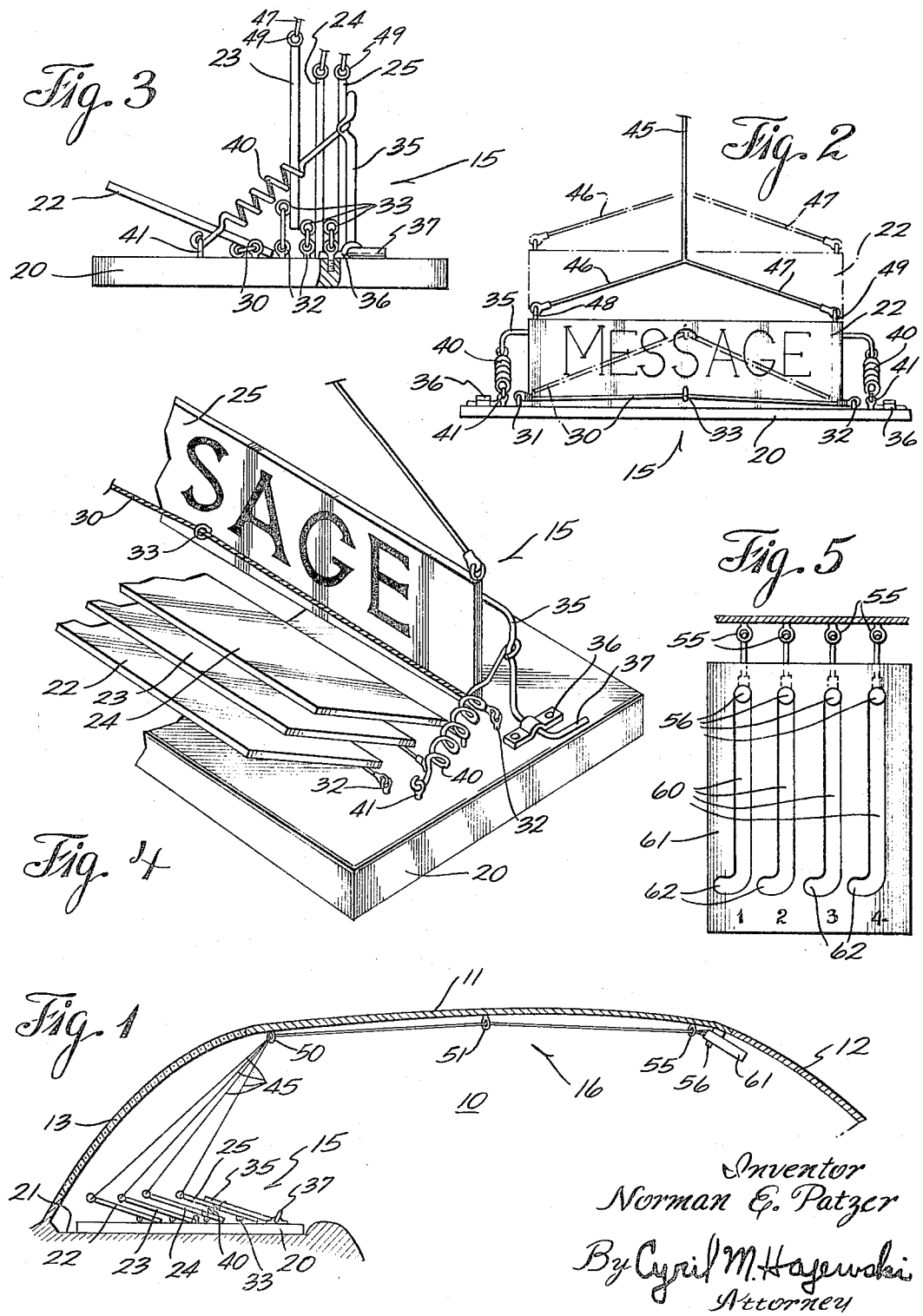

3,383,788
SIGN DISPLAY FOR VEHICLES
Norman E. Patzer, Rte. 4, Box 349,
Pewaukee Village, Wis. 53072
Filed May 2, 1966, Ser. No. 546,871
6 Claims. (Cl. 40—129)

ABSTRACT OF THE DISCLOSURE

A group of signs on the rear deck of a passenger automobile that may be raised selectively, by the driver for viewing from outside of the vehicle through its rear window. The several signs are attached to separate cables that extend to the front of the vehicle where they can be manipulated by the driver for raising the desired one of the signs and the cable can be secured to retain the selected sign in raised position.

---

This invention relates generally to an improved sign display for vehicles and more particularly to an improved arrangement for displaying signs in the rear window of an automotive vehicle.

During travel by automotive vehicles in traffic, the need frequently arises for communication with the driver of a vehicle that is following. Modern automobiles are equipped with a variety of accessories but have failed to provide any means for communicating with the drivers of adjacent moving vehicles in traffic. Occasionally there is an urgent need for such communication with the driver of a vehicle that is immediately to the rear, and particularly on modern high speed highways. For example, a stoppage of traffic ahead may become visible to the driver of a first car but is out of the view of the driver of the car that is following. For the sake of safety to both drivers, it may be well to warn the driver of the car that is following that they are approaching a stop ahead. This may be readily done by displaying an appropriate message in the rear window of the leading car for the information of the driver that is following. On the other hand, it may be desirable to selectively display advertising messages for viewing by pedestrians when the vehicle is parked.

It is therefore a general object of the present invention to provide an automotive vehicle with an improved mechanism for displaying signs for viewing from outside the vehicle.

Another object is to provide a sign display having several different messages that may be displayed selectively in a window of a passenger vehicle for viewing by the passengers in nearby vehicles when the vehicle is moving, or by pedestrians when the vehicle is parked.

Another object is to provide a sign display for mounting in a window of a passenger vehicle in which the several signs of the display normally do not obstruct the view through the window, but may be displayed in the window selectively for display purposes.

A further object is to provide an improved sign display for automotive vehicles that is of sturdy but inexpensive construction while being efficient in operation.

According to this invention the improved sign display comprises a plurality of signs with each containing a different message. The lower edges of the signs are coupled to a base so that they may be pivoted downwardly against the surface of the base to a concealed position where they permit full vision to the outside. A spring urged bracket normally retains the several signs in the concealed position. In order to display any one of the signs, it is only necessary to pivot it upwardly into a plane that is transverse to the base. The message on the raised sign then becomes plainly visible.

For remote operation of these signs, each is attached to a cable that extends to the remote location. For example, in a passenger automobile, the signs may be mounted at the rear window and the cables will extend to the front of the vehicle for operation by the driver or a passenger. The cables are labeled to identify the sign to which they are attached. The operator merely selects the appropriate cable and pulls it to raise the desired sign for viewing through the rear window. A retainer is provided for securing the cable to retain the sign in the raised position against the force applied by the spring that is urging it to the concealed position.

The foregoing and other objects of the invention, which will become more fully apparent from the following detailed description, may be achieved by means of the apparatus described in connection with the accompanying drawings in which:

FIGURE 1 is an elevational view of a sign display incorporating the features of the invention, the display being shown installed in the passenger compartment of an automobile with the roof and upper side wall of the automobile being cut away to reveal the interior of the passenger compartment;

FIGURE 2 is a front elevational view of the sign unit illustrated in FIGURE 1 as a part of the entire display mechanism;

FIGURE 3 is a side elevational view of the sign unit shown in FIGURE 2;

FIGURE 4 is a fragmentary perspective view depicting a portion of the sign unit shown in FIGURE 2; and FIGURE 5 is a detail view illustrating the retainer portion of the remote control unit of the sign display.

Reference is now made more particularly to the drawings which illustrate a sign display incorporating the features of the present invention. The sign display assembly of the present invention is shown in FIGURE 1 mounted within the passenger compartment of an automobile. The passenger automobile includes a passenger compartment 10, the upper portion of which is defined by a roof 11 with a front windshield 12 and a rear window 13.

The sign display is illustrated as being operationally mounted within the passenger compartment 10 and comprises a sign unit generally identified by the reference numeral 15 and a remote control unit generally identified by the reference numeral 16. The sign unit 15 is mounted so that its several signs, when displayed, may be viewed from the exterior of the vehicle through the rear window 13. It comprises a base 20 mounted on a rear deck 21 of the passenger compartment 10. The base 20 is secured to the rear deck 21 by suitable fasteners (not shown). The several signs are carried by the top surface of the base 20 with the exemplary embodiment showing four such signs 22, 23, 24 and 25. The number of signs, of course, may be varied to suit the circumstances.

The several signs of the sign unit 15 are adapted to normally lie against each other in juxtaposition with the top surface of the base 20 to conceal their messages and leave an unobstructed view through the rear window 13. On the other hand, when it is desired to display one of the signs so that its message may be viewed through the rear window 13, that particular sign is pivoted upwardly into a plane that is transverse to the top surface of the base 20 and, in addition, the sign is raised above the surface of the base 20 so that it is in full view through the window 13. Thus, in FIGURE 4, the sign 25 is illustrated in the displayed position while the signs 22, 23 and 24 remain in their concealed position. In FIGURE 1, all four of the signs are illustrated in their concealed position resting against each other in overlapping relationship toward the top surface of the base 20.

The several signs 22, 23, 24 and 25 are coupled to the base 20 for pivotal movement relative thereto by elastic cords 30 with a separate elastic cord 30 being provided for each of the signs. An eyebolt 31 is mounted on one side of the base 20 for each of the signs 22, 23, 24 and 25 while another eyebolt 32 is mounted on the opposite side of the base 20 for each of the signs. Accordingly, in the exemplary embodiment, four eyebolts 31 are mounted on one side of the base 20 in spaced relationship to accommodate the four signs, and another four eyebolts 32 are mounted on the opposite side of the base 20 to cooperate with the four eyebolts 31. Each of the signs 22, 23, 24 and 25 is also provided with a central eyebolt 33 for receiving the elastic cord 30 with the eyebolt 33 extending outwardly from the front surface of the signs. Each of the elastic cords 30 passes through the eye of the eyebolt 33 and has one end secured to the eyebolt 31 with the other end being attached to the eyebolt 32. Thus, the elastic cord 30, by reason of its passage through the eye of the eyebolt 33, couples its associated sign to the base 20 in a manner to enable the sign to pivot relative to the base 20 between its downward or concealed position and its raised or visible position. In addition, the elasticity of the cord 30 permits each of the signs to be lifted a limited distance above the surface of the base 20 to raise it above the level of the signs that remain in the concealed position and bring it into full view through the rear window 13.

The several signs 22, 23, 24 and 25 are continuously urged toward their concealed position by a spring urged bracket 35 that is secured to the base 20 for pivotal movement relative thereto by clips 36. Each end of the bracket 35 terminates with a rearwardly extending leg 37 that serves to limit the rearward pivotal movement of the bracket 35 to a position that is substantially transverse to the base 20. The bracket 35 is continuously urged to pivot forwardly by a pair of coil springs 40 that have one end secured to the bracket 35 while the opposite end is secured to an eyebolt 41 which is fixed to the base 20 forwardly of the clips 36.

The bracket 35 engages the rear surface of the rearmost sign, which in the exemplary embodiment is the sign 25. The two springs 40 continuously urge the bracket 35 to pivot in a counter-clockwise direction, as viewed in FIGURE 3, to yieldably force the signs 22, 23, 24 and 25 in a pivotal movement to their concealed position toward the top surface of the base 20 as shown in FIGURE 1. When it is desired to display one of the signs through the rear window 13, it is pivoted in a clockwise direction as viewed in FIGURE 3, against the force applied by the spring urged bracket 35, until the selected sign is in a substantially vertical position. It is then raised a specific distance to render it clearly visible above the level of the signs that remain in the concealed position. In FIGURE 4, the rearmost sign 25 is shown in the displayed position and it has forced the bracket 35 from the inclined position shown in FIG. 1 to a substantially vertical position to permit the sign 25 to be likewise held in a substantially vertical position for display purposes. The remaining signs 22, 23 and 24 remain resting in their concealed position. On the other hand, if one of the other signs is raised to the display position it will cause a corresponding pivotal movement in a clockwise direction of the signs behind it. For example, in FIGURE 3, the sign 23 is shown in its displayed position and its pivotal movement has caused a corresponding pivotal movement of the signs 24 and 25 to their vertical positions along with the spring urged bracket 35. When the sign 23 is released, the bracket 35 will take over to force all three of the signs 23, 24 and 25 to their concealed positions.

The signs are shifted to their display positions by the remote control unit 16 which includes a separate cable 45 for each of the signs 22, 23, 24 and 25. Each cable 45 includes two branches 46 and 47 as illustrated in FIGURE 2 with the branch 46 being secured to an eyebolt 48 at one end of the sign and the branch 47 being secured to an eyebolt 49 at the opposite end of the sign. Both eyebolts 48 and 49 extend upwardly from opposite ends of the top edge of each of the signs. The four cables 45 extend along the top inner surface of the roof 11 and are guided by a pair of eyebolts 50 and 51. At the front part of the passenger compartment 10, an independent eyebolt 55 is provided for each of the four cables 45 to separate them as clearly shown in FIGURE 5. The end of each of the cables is provided with a button 56 and each of the buttons 56 is slidable in a separate slot 60 formed in a control panel 61 that is mounted within the interior of the passenger compartment 10 above the windshield 12. Each of these slots 60 terminates in an upwardly curved portion 62 which serves as a retainer for its associated button 56.

The selected sign is raised into display position by moving its cooperating button 56 from its uppermost position as shown in FIGURE 5 downwardly along the slot 60 into the curved portion 62 which retains the button therein. The movement of that particular button 56 pulls the cable 45 to which it is attached for pivoting the associated sign to the vertical position and raising it upwardly to the position represented by the broken lines in FIGURE 2. The spring urged bracket 35 and the elastic cord 30 will be applying a force to the sign in the displayed position to retain that cable 45 taut. However, since the associated button 56 is in the upwardly curved portion 62 of its slot, the sign will not yield to the force. When it is desired to conceal the sign, the button 56 is removed from the curved portion 62 and permitted to move upwardly to the position depicted in FIG. 5 which will release the associated cable 45 to enable the bracket 35 to take over for placing the signs in their concealed positions.

From the foregoing detailed description of the construction and operation of the illustrative embodiment of the present invention, it will become apparent that a new and improved sign display has been provided for automotive vehicles. The sign display includes a plurality of signs that may be displayed selectively by the vehicle operator through the operation of a remote control unit and are normally urged to a concealed position where they do not obstruct the view when not on display.

Although the illustrative embodiment of the present invention has been described in considerable detail for the purpose of making a full disclosure of a practical operative arrangement by means of which the invention may be practised, it is to be understood that various novel features of the invention may be incorporated in other arrangements without departing from the spirit and scope of the invention as defined in the subjoined claims.

The principle of the invention having now been fully explained in connection with the foregoing description of embodying structure, I hereby claim as my invention:

1. In a sign display for displaying signs from a vehicle having a passenger compartment; a base mounted at the rear window of the vehicle within the passenger compartment of the vehicle; a plurality of signs mounted on said base for pivotal movement between a concealed position and a display position for viewing from outside the vehicle through the rear window of the vehicle; yieldable means urging said signs in their pivotal movement to the concealed position; a cable having one end attached to each of said signs so that any one of said cables may be pulled to pivot its associated sign upwardly into display position for viewing, said cables being disposed within the passenger compartment of the vehicle; a panel mounted at the front of the passenger compartment of the vehicle within reach of the vehicle operator; a cable actuator attached to the end of each of said cables opposite the end attached to their associated signs, said actuators being movably supported by said panel for movement between a release position and a display position for actuating said cables, with each cable releasing its associated sign for movement to the concealed position when its cooperating actuator is in the release position and the movement of each actuator to its display position pulling its associated cable with it to pivot its associated sign upwardly to the display position against the force applied by said yieldable means; and means for securing said actuators in the display position.

2. A sign display according to claim 1 wherein the pivotal support for mounting said signs on said base is yieldable to permit a limited amount of rectilinear movement in addition to the pivotal movement; and the movement of said actuators to the display position also operates to raise said signs rectilinearly above said base for clearer viewing.

3. A sign display according to claim 1 wherein said signs are disposed consecutively at the rear window of the vehicle so that one of said signs is at the end of the group; and said yieldable means comprises a bracket pivotably mounted adjacent to said end sign; and a spring urging said bracket against the end to force all of said signs in a pivotal movement to their concealed positions.

4. A sign display according to claim 1 wherein said actuators comprise buttons with one button being attached to each of said cables, said buttons being slidably supported by said panel for movement between the release position and the display position.

5. A sign display according to claim 4 wherein said panel includes a separate slot for each of said buttons and one of said buttons is slidably retained in each slot; and said securing means comprises a curved portion in each slot to retain a button moved therein in its display position against the yieldable force urging the button to its release position.

6. In a sign display according to claim 2 wherein each of said signs is coupled to said base for its pivotal movement by an elastic cord, said elastic cord yieldably retaining the bottom edge of its associated sign toward said base but permitting the rectilinear movement of said sign above said base a limited distance above the level of the other signs for better viewing.

References Cited

UNITED STATES PATENTS

| | | | |
|---|---|---|---|
| 1,167,372 | 1/1916 | Bemiss | 40—67 |
| 1,179,497 | 4/1916 | Bemiss | 40—67 X |
| 1,227,387 | 5/1917 | Christie | 40—67 |
| 1,267,790 | 5/1918 | Nordstrom | 40—67 |
| 1,465,405 | 8/1923 | Arrington | 40—129 |
| 2,843,952 | 7/1958 | Zgraggen | 40—129 |
| 3,141,253 | 7/1964 | Bartram | 40—129 |

EUGENE R. CAPOZIO, *Primary Examiner.*

W. W. NIELSEN, *Assistant Examiner.*